United States Patent [19]

Behrendt et al.

[11] Patent Number: 5,198,620
[45] Date of Patent: Mar. 30, 1993

[54] CAP SLEEVE

[75] Inventors: Martin Behrendt, Hagen; Richard Kandt, Bochum; Peter Steinmetz, Schwerte, all of Fed. Rep. of Germany

[73] Assignee: RXS Schrumpftechnik-Garnituren GmbH, Fed. Rep. of Germany

[21] Appl. No.: 728,516

[22] Filed: Jul. 11, 1991

[30] Foreign Application Priority Data

Nov. 8, 1990 [DE] Fed. Rep. of Germany ....... 4035557

[51] Int. Cl.⁵ ............................................. H02G 15/10
[52] U.S. Cl. .............................. 174/74 R; 174/74 A; 174/77 R; 174/93
[58] Field of Search ............... 174/74 R, 77 R, 74 A, 174/92, 93, 88 R

[56] References Cited

U.S. PATENT DOCUMENTS

| 3,130,259 | 4/1964 | Rischard et al. | 174/93 |
| 3,557,299 | 1/1971 | Dienes | 174/77 R X |
| 4,103,911 | 8/1978 | Giebel et al. | 277/210 |
| 5,006,669 | 4/1991 | Bachel et al. | 174/93 |
| 5,059,748 | 10/1991 | Allen et al. | 174/87 |

FOREIGN PATENT DOCUMENTS 2172449 9/1986 United Kingdom ................. 174/93

Primary Examiner—Morris H. Nimmo
Attorney, Agent, or Firm—Hill, Steadman & Simpson

[57] ABSTRACT

A cap sleeve is composed of a pipe-shaped envelope body having at least one end opened and is closed by a disk-shaped sealing member which has cable introduction seals. The sealing member is provided with an adapter, with whose assistance a radially-effective sealing system of the presently known type is converted into a basically axially effective sealing system.

20 Claims, 4 Drawing Sheets

CAP SLEEVE

BACKGROUND OF THE INVENTION

The present invention is directed to a cap sleeve which is composed of an envelope body having an opening at one end and an actually known sealing member arranged in the open end. The sealing member is composed of a joint ring with a cable introduction opening and a ring-shaped sealing system arranged on an exterior circumference of the sealing member.

German OS 24 27 677 and U.S. Pat. No. 4,103,911, whose disclosure is incorporated by reference, disclose a cable sleeve which has an envelope formed of a slotted cable sleeve that is provided with sealing members at both ends. In case of an unslotted socket pipe or either a cup-shaped or cap-shaped envelopes which are closed on one end and have an opposite open end, such a sealing member cannot be utilized directly because, in case of this method, the sealing forces are effected only in a radial direction.

It is, however, desirable that such sealing members can be utilized in optimally universal fashion so that, with them, also unslotted cable pipes or cap sleeves can also be equipped with such a sealing member.

SUMMARY OF THE INVENTION

The object of the present invention is to create a cap sleeve wherein conventional sealing members, which are primarily intended for slotted cable sleeves, can, likewise, be satisfactorily employed for closing the open end of the cap sleeve. The stated object is achieved with a cap sleeve having a sealing system utilizing a sealing member which has a ring-shaped adapter which increases an exterior groove edge of the sealing system as a ring-shaped overprojection so that, on its outside, the overprojection has a slanted bevel that flares out. The envelope is matched to the diameter of the overprojection and has a flange with an all-around conical bevel arrangement corresponding in dimensions to the overprojection of the adapter, so that when the sealing ring is inserted between the flange of the envelope and the overprojection of the adapter and when the flange of the envelope and the overprojection adapter are enveloped in the clamping fashion by a locking ring with inwardly-directed grooves, whose edges have adapted conical bevellings, the sealing ring will be placed in a tight sealing relationship to complete the seal of the end face.

When combining the adaptor with conventional sealing members, it becomes possible, according to the present invention, to use the sealing member not only in slotted cable sleeves, but also with cap sleeves, which have a socket sleeve that is closed on one end, and with unslotted envelopes. Thus, the originally, merely radially-directed sealing forces are redirected in the area of the sealing groove of the sealing member due to the shape of the adapter in cooperation with the adapted flange of the envelope so that they largely have the effect in an axial direction, namely between the sealing surface of the adapter and the flange surface of the envelope. Thus, it is possible that an already-existing socket sleeve can be converted without the sealing system of the cable introductions being damaged. Among other things, a cap sleeve often has the advantage that it can be fastened without any problems either on a pole or wall. Thus, a problem-free conversion from a socket pipe system to a cap sleeve system is now possible, wherein these systems can now be designed to be compatible with each other.

Since, in the field of light waveguide paths, particularly in the case of aerial cable paths, the cap-shape becomes more and more popular, the socket pipe system can be converted to a cap system without the cable introduction seals having to be Due to the form of the adapter and in cooperation with the ring-shaped flange of the envelope, it is achieved that the seal for the envelope in the area of the sealing member occurs no longer in the radial direction, but more in the axial direction. In this way, it is possible, according to the present invention, to employ such a sealing member with an originally radially directed sealing system also for an unslotted envelope, such as caps or cups. Naturally, socket pipes that must be closed on both ends can be used, as well, following the same principle. This has the particular advantage that in the case of such a newly designed socket sleeve, the already-mounted sealing members can be used without having to destroy the cable introduction seals.

Other advantages and features of the invention will be readily apparent from the following description of the preferred embodiments, the drawings and claims.

DESCRIPTION OF THE PREFERRED EMBODIMENTS

Figure 1:
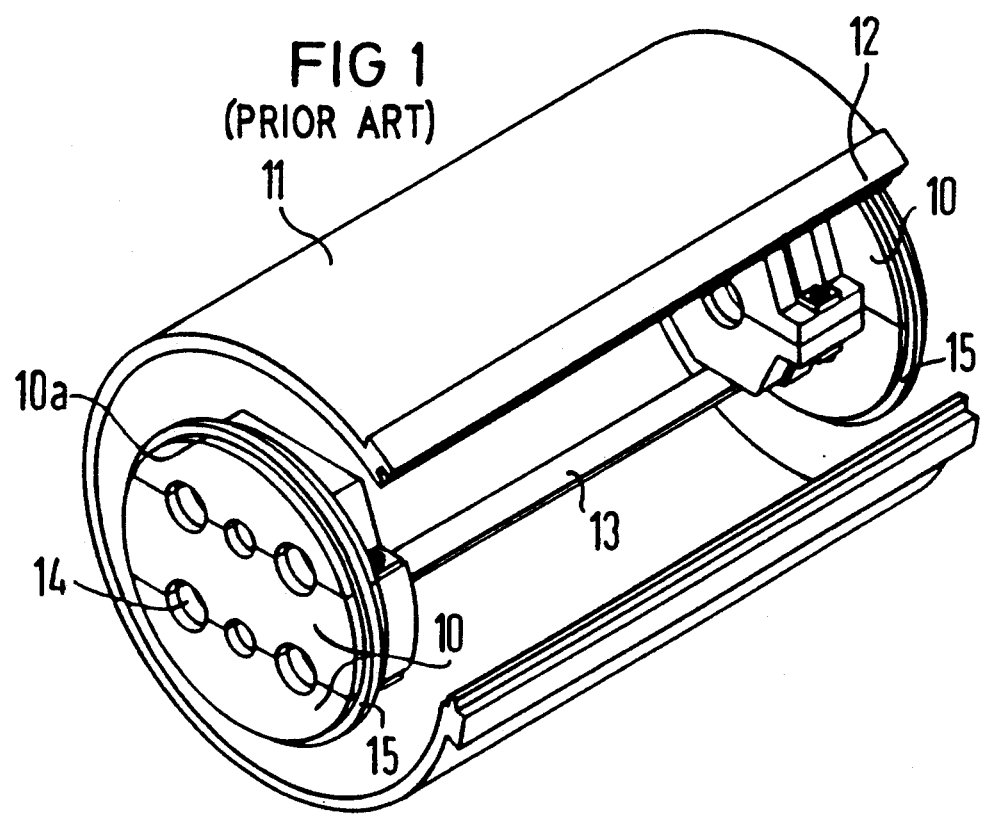
FIG. 1 is a perspective view of a cable sleeve having a slotted socket pipe or envelope utilizing sealing members in accordance with a known arrangement.

In a standard cable sleeve structure, such as illustrated in FIG. 1, a divided or slotted socket pipe or sleeve 11 cooperates with two sealing members 10 arranged in each end. These sealing members are possibly divided into several parts so that the sealing members 10 can be installed or assembled on uncut cables which are received in openings 14. The two sealing members 10 are connected with one another, for example by a junction or connecting rail 13, which also can serve as a ground junction rail. The two sealing members 10 are provided with sealing systems 10a that proceed all around in a ring-shaped fashion, wherein one is composed of an all-around or peripheral groove with a ring seal 15. The sealing of the cable sleeve in the ring area occurs when the slotted cable sleeve 11, which is provided with a longitudinal seal composed of two seams or edges 12, is closed by having locking or clamping rails pulled over the edges 12. Thus, the sealing forces have an effect in a radial direction so that the arrangement in this form cannot be used for an unslotted socket pipe which may, possibly, be closed at only one end to be formed as a cup or cap.

Figure 4:
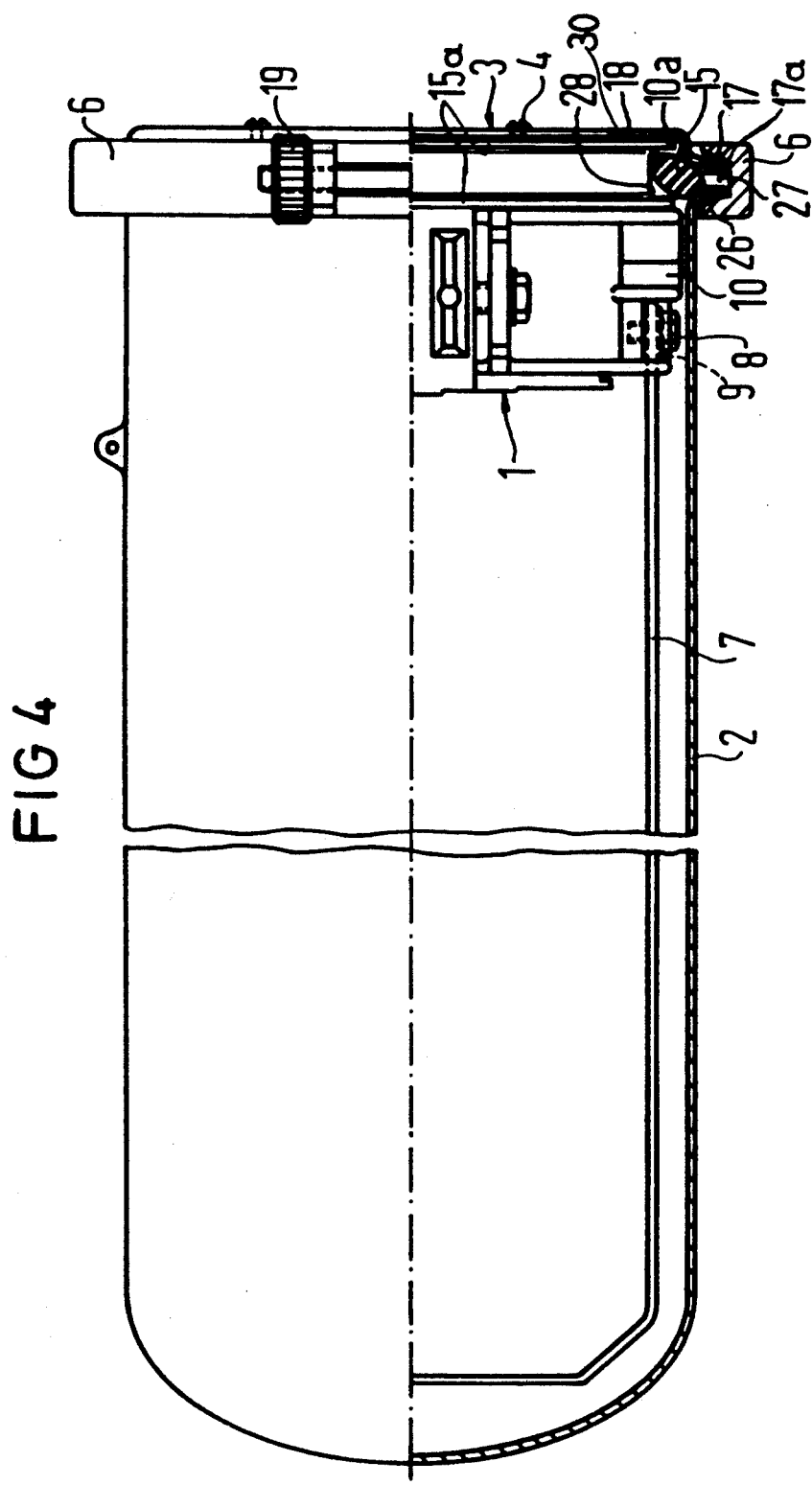
FIG. 4 is a side view with portions broken away for purposes of illustration of a cup or cap sleeve utilizing an undivided adapter of the present invention.

The principles of the present invention are particularly useful when incorporated into an arrangement or sealing system, generally indicated at 1 in FIG. 4, which utilizes an adapter 3 in accordance with the present invention.

Figure 2:
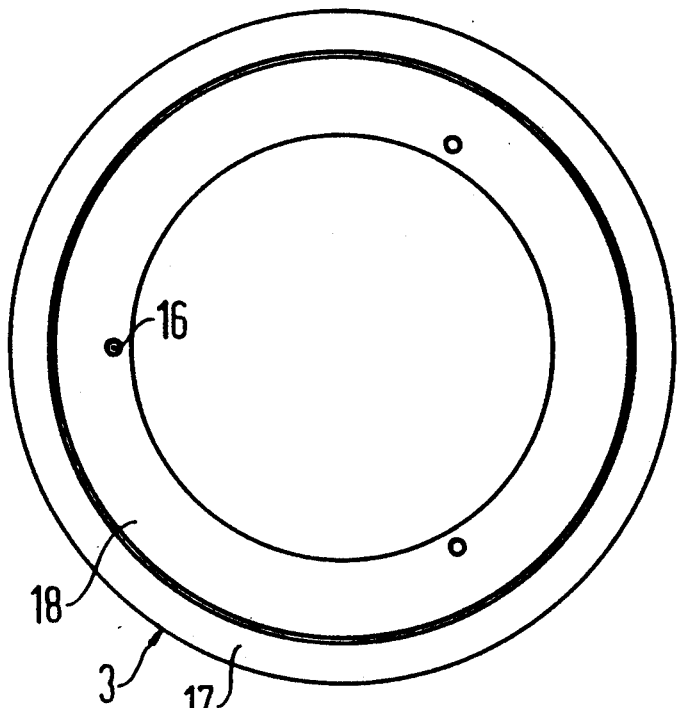
FIG. 2 is a front view of an undivided ring-shaped adapter according to the present invention.

As illustrated in FIG. 4, the adapter 3 can be employed as an exterior front surface of a priorly described sealing member 10 so that the sealing member can also be used for unslotted pipes or cups. Hereby, basically, a conversion from a radially effective sealing to an axially effective sealing system will occur. The adapter 3 is fashioned as a ring (FIG. 2) and has an inner ring area 18 which is placed on the outside of a sealing member 10 and fastened by means of screws arranged in holes 16. The outside edge of the adapter 3 is fashioned as a ring-shaped overprojection or flange 17 and serves as a sealing surface for an inserted sealing ring on an inwardly directed side 17a.

Figure 3:
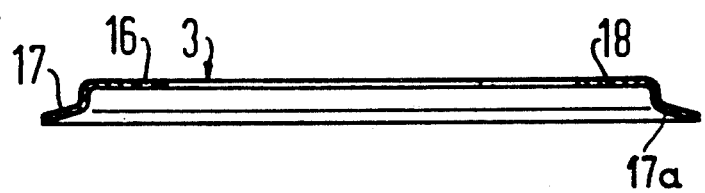
FIG. 3 is a cross sectional view of the adapter of FIG. 2.

As illustrated in FIGS. 3 and 4, the design of the adapter results in the overprojection or flange 17 being bent over toward one side, namely pointing toward the socket sleeve interior. This design serves the purpose to press the inside sealing surface 17a against the inserted seal ring 15 with assistance of an all-around clamp ring 6 placed on the outside of the flange 17 and a flange 26 of the socket pipe 2.

As illustrated in FIG. 4, the sealing system, generally indicated at 1, is composed of a sealing member 10, which is fashioned and employed in the standard manner, however, no cables are illustrated as being introduced for purposes of clarity. A rail 7 is arranged on the sealing member 10 by means of fastening elements 8 and 9. The sealing member 10 is provided with an annular or peripheral sealing groove 28, into which, so far, normally a sealing ring 15 has been employed and which ring is pressed against the pulled-on slotted socket pipe, such as used in FIG. 1. Here, the invention provides, however, that an adapter 3 is attached with screws 4 on a front surface of the member 10 within its ring area 18 so that the overprojection or flange 17 of the adapter 3 projects over an exterior edge 15a of the groove 28 of the sealing member 10. The overprojection 17 is thereby bevelled in a conical fashion toward the inside and, together with a mirror-image, bevelled flange 26 of a newly unslotted envelope 2, it forms an increased sealing groove 27 into which a sealing ring 15 is inserted. The two conically shaped edges of the projection 17 and the flange 26 are pressed together with the assistance of a clamp ring 6, which has an all-around and inwardly-directed adapted groove, whereby the inserted sealing ring 15 is basically pressed in an axial direction. In this way, the seal between the unslotted envelope 2, the sealing grooves of the sealing member 10 and the adapter 3 take place mainly in an axial direction. The upper half of FIG. 4 shows that the clamp ring 6 is provided with a screw lock 19. The envelope 2 can then be cap- or cup-shaped; however, it can also be composed of a pipe or hollow cylinder opened at both ends which, then, must have an outwardly directed annular flange 26 for the respective closing with the seal according to the present invention. The sealing ring 15 can consist of any plastic material, for example a butyl rubber or an elastic material, such as a silicone foam.

Figure 5:
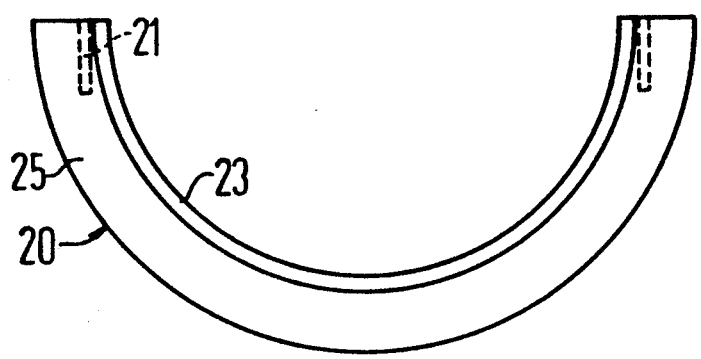
FIG. 5 is a front view of one part of a divided adapter according to the present invention.
Figure 6:
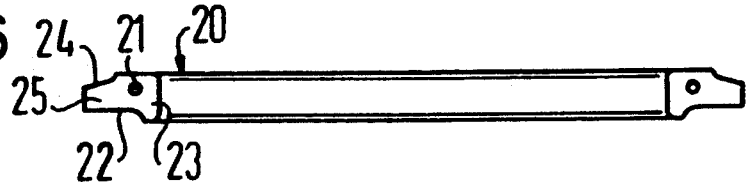
FIG. 6 is an end view of the adapter of FIG. 5.
Figure 7:
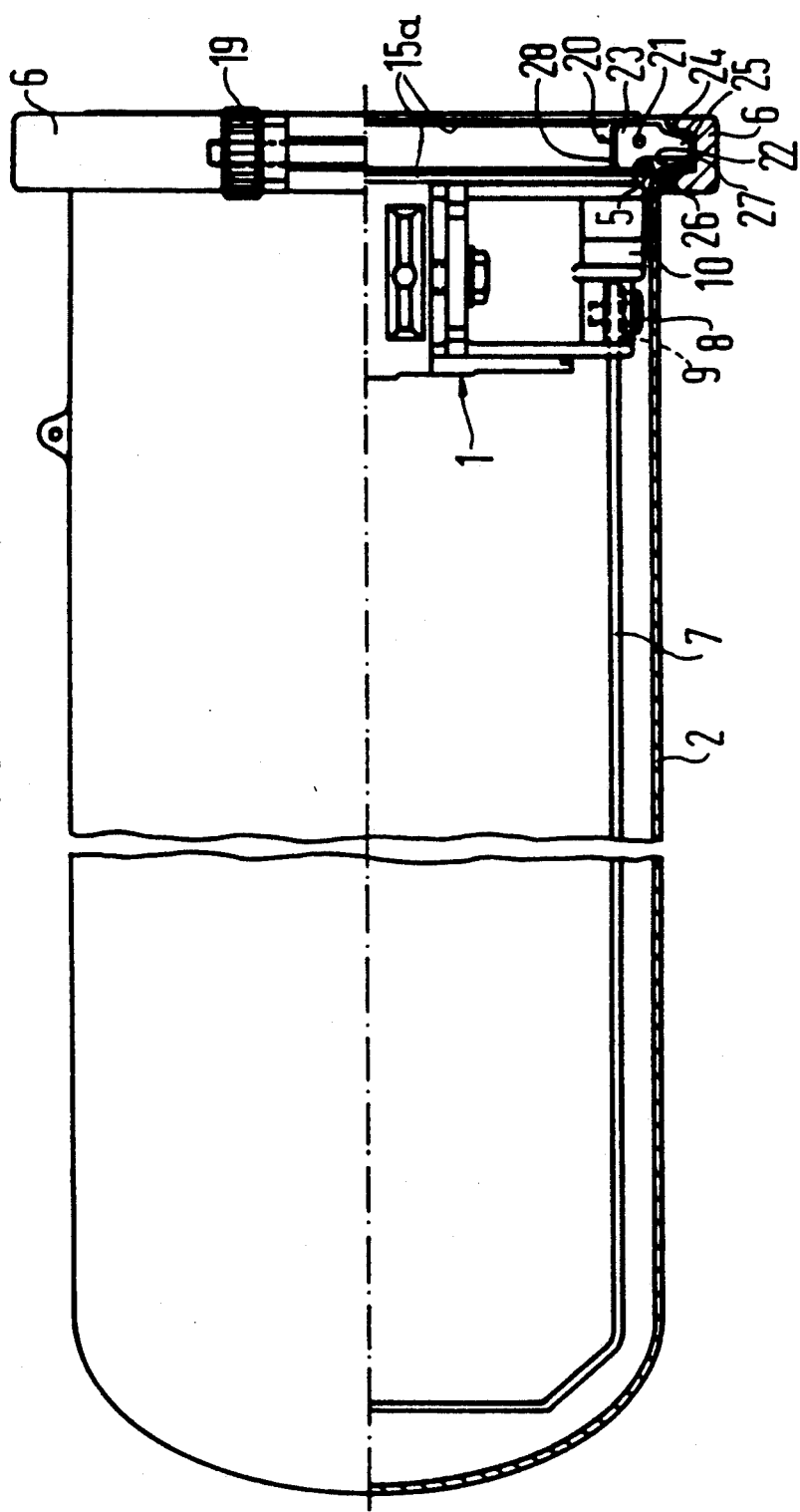
FIG. 7 is a side view with portions broken away for purposes of illustration of a cup or cap sleeve utilizing a divided adapter in accordance with the present invention.

In FIGS. 5, 6 and 7, a divided adapter 20, which is composed of two half-rings that are placed together in a sealing fashion in a dividing plane, is illustrate. A corresponding guidance and reinforcement across the disconnected plane occurs via pins, which are inserted in borings or holes 21. In the assembled condition, this adapter 20 is, again, constructed as a ring, namely in the form of the interior ring 23 corresponding to the form of the sealing groove 28 of the conventional sealing member 10. When assembled, the two halves of the adapter 20 are inserted in the sealing groove 28 and put together, whereby, too, the overprojection or flange 25 exists, which outwardly projects over the edges 15a of the sealing groove 28. On the side pointing toward the front end, this projection 25 is fashioned conically so that the adapter 20 will have a slanted bevel 24 which can again be pressed together, basically in the axial direction, together with an annular flange 26 on the envelope 2 when received in the ring groove 27 of the clamp ring 6 that is fashioned in double-conical fashion. Thus, the side 22 of the adapter 20, which is directed inwardly, is fashioned as a sealing surface so that an inserted sealing ring 5 results in a safe seal in cooperation between the adapter surface 22 and the edge of the flange 26 of the envelope 2. Here, too, the sealing forces are not only effected in a radial, but also in an axial direction. This enables, again, slot-free socket pipes, caps or cups which can be closed with a conventional sealing member of the described, and actually known, type when utilizing such an adapter.

In all cases, the elastic sealing ring composed of elastic material of the conventional type can be used as the sealing ring, but, in the same manner, one can also employ plastic sealing material in the form of bands, strings or similar shapes composed of actually known materials. It is also possible to introduce a combination of various sealing materials, for example the adapter can be inserted with an intermediate layer 30 of another elastic or plastic seal.

In the first exemplary embodiment, the adapter is secured on the sealing member, for example with an intermediate layer 30 of a sealing material, by threaded fasteners 4. In the sealing groove of the locking ring 6, likewise, further sealing material can be inserted.

The adapter is preferably composed of metal, plastic or, for example a polyethylene or a suitable plastic with glass fiber inserts, for example actually known glass fiber reinforced plastic materials, for example polyamide.

Although various minor modifications may be suggested by those versed in the art, it should be understood that we wish to embody within the scope of the patent granted hereon all such modifications as reasonably and properly come within the scope of our contribution to the art.

We claim:

1. In a cap sleeve, which is composed of an envelope body and at least one actual sealing member arranged to close an opening in the envelope body, said sealing member having cable introduction openings for sealingly receiving cables and having a radially opening, outer circumferential groove receiving a sealing element to form an annular sealing system between the envelope body and an outer circumference of the sealing member, the improvements comprising the sealing system including a ring-shaped shaped adapter for increasing an external groove edge of the circumferential groove, said adapter having a ring-shaped projection on an exterior surface, which has a slanted bevel that flares outwardly, the envelope body having a conically bevelled flange extending radially outward and with a diameter matched to a diameter of the projection, the sealing element being inserted between the flange of the envelope body and the projection of the adapter and the system including a clamp ring with an inwardly directed groove, whose edges have matched conical bevellings receiving the projection and flange in a clamped fashion to exert an axial closing force on the sealing element disposed therebetween.

2. In a cap sleeve according to claim 1, wherein the adapter is composed of a closed ring.

3. In a cap sleeve according to claim 1, wherein the adapter is formed by two half-ring portions.

4. In a cap sleeve according to claim 3, which includes means for holding the half-ring portions in an assembled ring shape.

5. In a cap sleeve according to claim 4, wherein said means for holding the two half-rings include a pin received in a bore in each of the half-ring portions.

6. In a cap sleeve according to claim 3, wherein each of the half-ring portions has an inner rim of a form matched to a sealing groove of the sealing member and the adapter is mounted in the sealing groove.

7. In a cap sleeve according to claim 1, wherein the adapter is composed of a closed ring, said adapter being attached to an external front surface of the sealing member by means of threaded fasteners.

8. In a cap sleeve according to claim 1, wherein the envelope is fashioned as a pipe.

9. In a cap sleeve according to claim 1, wherein the envelope is constructed in the form of a cup or cap.

10. In a cap sleeve according to claim 1, wherein the sealing element is composed of a plastic sealing material.

11. In a cap sleeve according to claim 10, wherein the plastic sealing material is a butyl rubber.

12. In a cap sleeve according to claim 1, wherein the sealing element is composed of an elastic sealing material.

13. In a cap sleeve according to claim 12, wherein the elastic sealing material is a silicone foam material.

14. In a cap sleeve according to claim 1, wherein the clamp ring has a lever lock.

15. In a cap sleeve according to claim 1, wherein the clamp ring has a quick-disconnect screw arrangement.

16. In a cap sleeve according to claim 1, wherein the adapter is composed of a metal.

17. In a cap sleeve according to claim 1, wherein the adapter is composed of a plastic material.

18. In a cap sleeve according to claim 17, wherein the plastic material of the adapter is a polyethylene.

19. In a cap sleeve according to claim 17, wherein the adapter is composed of a glass fiber, reinforced plastic material including polyamides.

20. In a cap sleeve according to claim 1, wherein a sealing material is inserted between the adapter and the sealing member.

* * * * *